US006685212B1

United States Patent
Penlerick et al.

(10) Patent No.: US 6,685,212 B1
(45) Date of Patent: Feb. 3, 2004

(54) COMBINATION TOW HOOK AND BASE PLATE SYSTEM FOR TOW BAR CONNECTION

(76) Inventors: Mark Penlerick, 514 Hillcrest Rd., Wayne, NE (US) 68787; Robert Rager, 1110 Logan St., Emerson, NE (US) 68733

(*) Notice: Subject to any disclaimer, the term of this patent is extended or adjusted under 35 U.S.C. 154(b) by 0 days.

(21) Appl. No.: 09/658,561

(22) Filed: Sep. 8, 2000

(51) Int. Cl.[7] .............................................. B60D 1/48
(52) U.S. Cl. ..................... 280/495; 280/477; 280/491.5
(58) Field of Search .............................. 280/477, 491.2, 280/491.5, 493, 495, 504, 498

(56) References Cited

U.S. PATENT DOCUMENTS

| | | | |
|---|---|---|---|
| 3,083,040 A | * | 3/1963 | Hayman et al. ............ 280/493 |
| 3,765,704 A | * | 10/1973 | Tierno ......................... 280/482 |
| 3,781,038 A | * | 12/1973 | Bachel et al. ............... 280/493 |
| 3,938,830 A | * | 2/1976 | Lane ........................... 280/493 |
| 4,022,489 A | * | 5/1977 | Shattles et al. ............ 280/491.5 |
| 4,047,734 A | | 9/1977 | Miles |
| 4,057,266 A | | 11/1977 | Duncan et al. |
| 4,194,755 A | | 3/1980 | Youngblood |
| 4,344,635 A | | 8/1982 | Welton |
| 4,352,668 A | | 10/1982 | Beevers et al. |
| 4,374,593 A | | 2/1983 | Smith et al. |
| 4,379,569 A | | 4/1983 | Koch |
| 4,564,209 A | | 1/1986 | Kingsley et al. |
| 4,614,354 A | * | 9/1986 | Stagner .................... 280/415.1 |
| 4,714,265 A | | 12/1987 | Franklin |
| 4,768,803 A | | 9/1988 | Hewitt et al. |
| 4,836,570 A | | 6/1989 | Lopez et al. |
| 4,856,805 A | | 8/1989 | Davis |
| 4,861,061 A | | 8/1989 | Frantz |
| 4,903,978 A | | 2/1990 | Schrum, III |
| 4,913,451 A | * | 4/1990 | Woodall .................... 280/478.1 |
| 4,938,496 A | | 7/1990 | Thomas et al. |
| 4,946,185 A | | 8/1990 | Likei |
| 5,000,473 A | | 3/1991 | Johnson |
| 5,054,806 A | | 10/1991 | Chester |
| 5,067,742 A | | 11/1991 | Relja |
| 5,071,153 A | | 12/1991 | Duncan |
| 5,088,754 A | | 2/1992 | Skelton |
| 5,090,718 A | | 2/1992 | Kauffman |
| 5,147,095 A | | 9/1992 | Duncan |
| 5,150,911 A | | 9/1992 | Williams |

(List continued on next page.)

FOREIGN PATENT DOCUMENTS

DE 3631688 * 4/1987

*Primary Examiner*—Brian L. Johnson
*Assistant Examiner*—Christopher Bottorff
(74) *Attorney, Agent, or Firm*—Donald R. Schoonover

(57) ABSTRACT

A combination tow hook and base plate system for connecting a tow bar to a towed vehicle. The system includes transversely opposed tow hook members, each having a closed loop configuration, connected to the towed vehicle. The system also includes base plate members configured to be operatively connected to the tow bar, each base plate member including a horizontally oriented spacer plate, a stiffener, an optional cross member interconnecting the base plate members, and a tow bar connector mechanism. The system further includes connector mechanisms configured to operatively connect the base plate members to the tow hook members, each connector mechanism including a connector plate, a spacer configured to be slidably insertable through the closed loop configuration of the respective tow hook member, and a fastening mechanism. The connector plates, spacer plates, and fastening mechanisms are configured to cooperatively and removably secure the base plate members to the tow hook members. For some applications, the length of the optional cross member may be adjustable. A kit and a method of using the combination tow hook and base plate system is provided.

25 Claims, 2 Drawing Sheets

U.S. PATENT DOCUMENTS

| | | |
|---|---|---|
| 5,184,839 A | 2/1993 | Guedry |
| 5,203,582 A | 4/1993 | Smyly, Sr. |
| 5,240,273 A | 8/1993 | Stead et al. |
| 5,286,050 A | 2/1994 | Stallings, Jr. et al. |
| 5,288,094 A * | 2/1994 | Putnam ..................... 280/420 |
| 5,306,037 A | 4/1994 | Robertson |
| 5,326,123 A | 7/1994 | Guest et al. |
| 5,433,467 A | 7/1995 | Easterwood |
| 5,571,270 A | 11/1996 | Larkin |
| 5,685,554 A * | 11/1997 | Poxleitner ............... 280/491.2 |
| 5,697,630 A | 12/1997 | Thompson et al. |
| 5,716,066 A | 2/1998 | Chou et al. |
| 5,725,229 A | 3/1998 | McWethy |
| 5,725,233 A * | 3/1998 | Gee et al. ................. 280/491.5 |
| 5,738,363 A | 4/1998 | Larkin |
| 5,755,454 A | 5/1998 | Peterson |
| 5,762,374 A * | 6/1998 | Grove et al. ................. 280/847 |
| 5,765,851 A | 6/1998 | Parent |
| 5,845,922 A | 12/1998 | Warner |
| 5,873,595 A | 2/1999 | Hinte |
| 5,893,575 A | 4/1999 | Larkin |
| 5,915,714 A | 6/1999 | Bell et al. |
| 6,080,014 A * | 6/2000 | Steiler ......................... 439/574 |
| 6,095,546 A * | 8/2000 | Austin ........................ 280/507 |

* cited by examiner

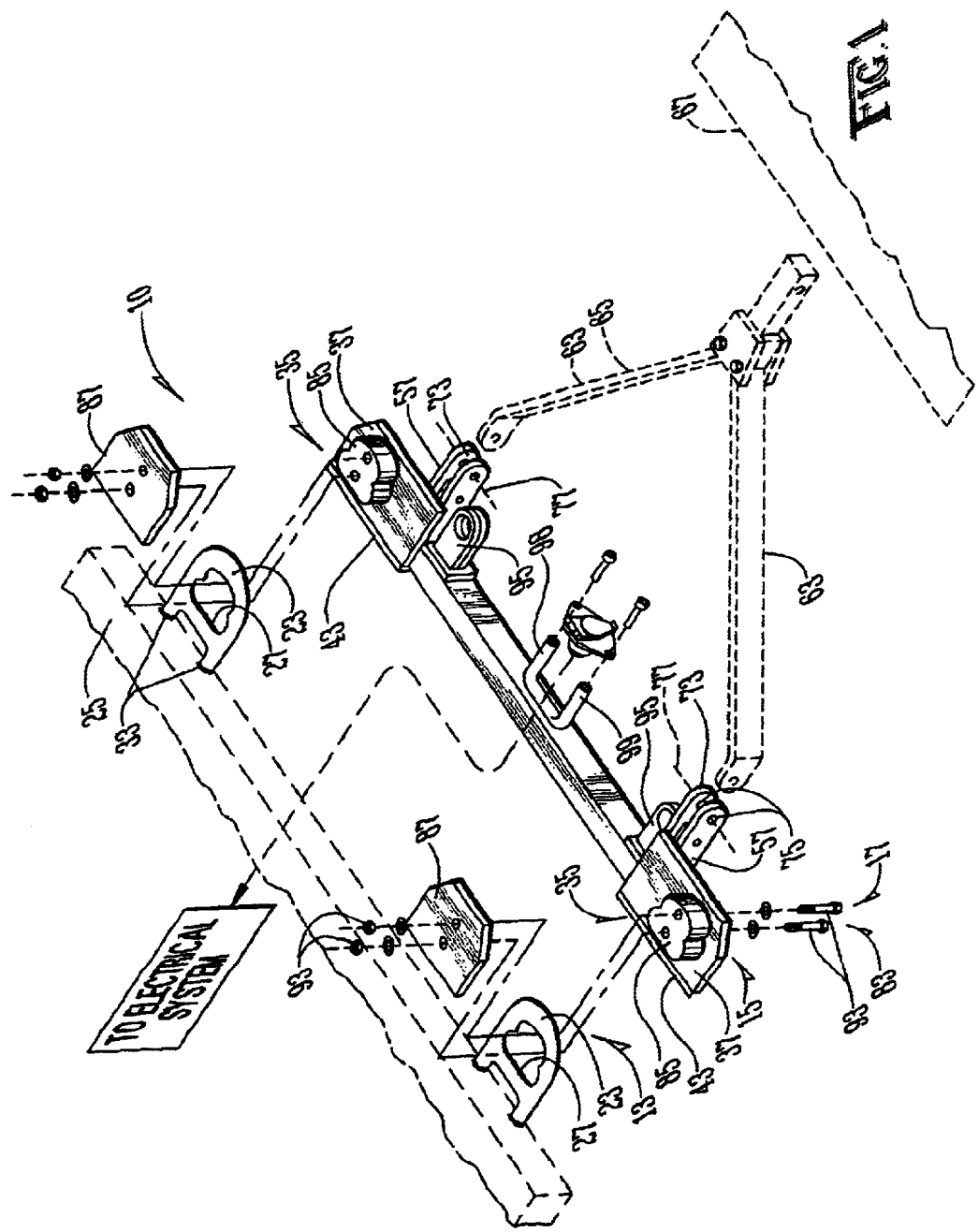

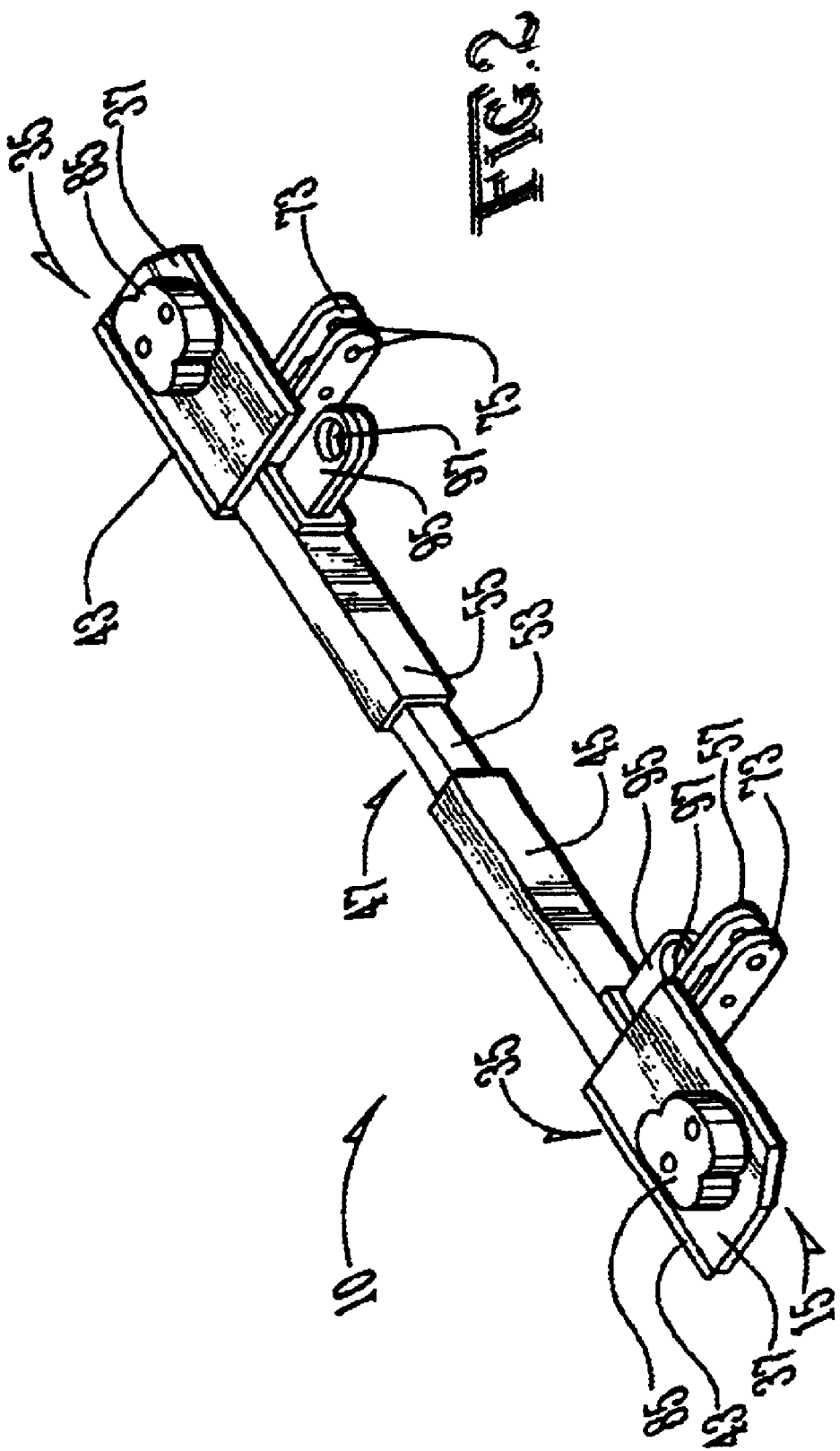

COMBINATION TOW HOOK AND BASE PLATE SYSTEM FOR TOW BAR CONNECTION

BACKGROUND OF THE INVENTION

1. Field of the Invention

This invention relates generally to apparatus for connecting a towed vehicle to a towing vehicle and, more specifically but without limitation, to base plates for mounting a tow bar to tow hooks of a towed vehicle.

2. Description of the Related Art

A common occurrence is the towing of an automobile, commonly referred to as the towed vehicle, behind a recreational vehicle or motorhome, commonly referred to as the towing vehicle. Such an activity requires providing a towing arrangement between the towing vehicle and the towed vehicle. Generally, the towing arrangement comprises the installation of a base plate mechanism to the lower front frame of the towed vehicle, the installation of a ball or receiver hitch to the rear frame of the towing vehicle, and providing a tow bar to pivotally connect the base plate mechanism to the hitch.

One such base plate mechanism is taught in U.S. Pat. No. 5,716,066, issued Feb. 10, 1998 to Shu-King Chou et al. The Chou et al device requires the mounting of four brackets or members to the towed vehicle, namely first and second bumper mounting brackets attached to the front bumper rail, and first and second side mounting brackets each securely attached to right and left side rails. Generally, installation of the various brackets require that holes be bored in structural members of the vehicle. Each such hole further weakens the structural integrity of the towed vehicle from that of its original design.

What is needed in an arrangement for providing a base plate arrangement for a towed vehicle wherein the number of brackets thereof attached to towed vehicle is reduced, and wherein the number of installation holes bored in the towed vehicle are reduced or entirely eliminated.

SUMMARY OF THE INVENTION

An improved system is provided for a tow hook apparatus for connecting a towed vehicle to a tow bar of a towing vehicle. The improved system generally includes a pair of transversely opposed tow hook members connected to a towed vehicle wherein each tow hook member has a closed loop configuration. The improved system also generally includes a pair of base plate members configured to be operatively connected to a tow bar wherein each base plate member includes a horizontally oriented spacer plate, a stiffener, an optional cross member interconnecting the base plate members, and a tow bar connector mechanism. Further, the improved system generally includes a pair of connector mechanisms configured to operatively connect the base plate members to the tow hook members wherein each connector mechanism includes a connector plate, a spacer configured to be slidably insertable through the closed loop configuration of the respective tow hook member, and a fastening mechanism. The respective connector plates, spacer plates, and fastening mechanisms are configured to cooperatively and removably secure respective base plate members to respective tow hook members. For some applications, the improved system may include a cross member connected to the base plate members wherein the cross member has a selected length. Other applications of the improved system may include a cross member wherein the length thereof is adjustable. A U-shaped mount connected to the base plate member is provided for electrical connection between the towing vehicle and the towed vehicle. Also, a safety chain bracket may be attached to the base plate member.

The improved system includes a kit and a method for realizing the benefits of the present invention.

PRINCIPAL OBJECTS AND ADVANTAGES OF THE INVENTION

The principal objects and advantages of the present invention include: providing a system for mounting a base plate device to a towed vehicle; providing such a system for mounting a base plate device to factory installed tow hooks of a towed vehicle; providing such a system for providing a combination tow hook and base plate system for a towed vehicle; providing such a system wherein a base plate device thereof is easily removable from a tow hook device thereof; providing such a system having a readily accessible electrical access for connecting lighting devices of the towed vehicle to lighting systems of the towing vehicle; and generally providing such a system that is economical to manufacture, effective in operation, reliable in performance, capable of long operating life, convenient to operate, and particularly well adapted for the proposed usage thereof.

Other objects and advantages of the present invention will become apparent from the following description taken in conjunction with the accompanying drawings, which constitute a part of this specification and wherein are set forth exemplary embodiments of the present invention to illustrate various objects and features thereof.

BRIEF DESCRIPTION OF THE DRAWINGS

FIG. 1 is an exploded perspective view of a combination tow hook and base plate system for a tow bar connection, according to the present invention.

FIG. 2 is an enlarged, fragmentary view of the combination tow hook and base plate system for a tow bar connection, showing an adjuster for adjusting the lateral spacing between base plate members of the combination tow hook and base plate system, according to the present invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 10 generally refers to a combination tow hook and base plate system for a tow bar connection, as shown in FIGS. 1 and 2. The system 10 generally comprises tow hook means 13, base plate means 15, and connector means 17.

The tow hook means 13 includes at least one tow hook member 23 configured to be fixedly connected to an underside of the chassis or frame 25 structure of a vehicle to be towed. Preferably, the at least one tow hook member 23 will comprise two of the tow hook members 23, each spaced transversely opposite to each other and having a generally horizontally oriented, closed loop configuration 27. For example, each of the tow hook members 23 in FIG. 1 are shown with a horizontally oriented "figure eight" or "bread slice" configuration 27. Each of the tow hook members 23 generally has provisions 33, such as a pair of rearwardly extending legs 33, for example, as shown in FIG. 1, for permanent attachment to the towed vehicle 25 such as by welding or other suitable means. It is to be understood that bolts and nuts, for example, may be used to secure the tow members 23 to the towed vehicle 25; welding, however, is preferred over bolts and nuts as holes penetrating the frame 25 for accommodating the bolts, which may weaken the vehicular frame 25, are thereby eliminated.

Some vehicles 25, such as 1997–1999 Ford F-150 ® and 1997–1999 Ford Expedition® vehicles are provided with a pair of factory installed tow hooks. In that event, the present invention 10 would preferably utilize those pre-installed tow hooks as those tow hooks and the vehicular structure connected to those tow hooks would generally have the necessary ruggedness needed for towing purposes already designed thereinto.

The base plate means 15 generally includes at least one base plate member 35 configured to be removably secured to a respective one of the tow hook members 23. Thus, if a particular application of the present invention 10 utilizes two tow hook members 23, the present invention will generally also utilize two base plate members 35. Generally, each of the base plate members 35 includes a spacer plate 37 configured to operatively and abuttingly engage the respective tow hook member 23 as hereinafter explained. If desired, each of the base plate members 35 may also include a stiffener 43 fixedly secured to the respective spacer plate 37 to provide additional ruggedness and support thereto. It is to be understood that the stiffener 43 and respective spacer plate 37 may be integrally formed, such as from angular stock for example.

If desired, the base plate means may include an elongate cross member 45 that extends between the base plate members 35, as shown in FIG. 1. In that event, the cross member 45 would be securely connected to the plates 37 and/or the stiffeners 43.

For some applications wherein the cross member 45 is utilized, it may be desirable that the length of the cross member 45 be adjustable as the present invention 10 is being fitted to a particular vehicle. In that event, the cross member 45 may include an adjuster 47 that allows the spacing between the base plate members 35 to accommodate the spacing between the corresponding tow hook members 23. For example, the adjuster 47 may comprise a arrangement wherein a inner cross member 53 is telescopically displaceable longitudinally within an outer cross member 55, as shown in FIG. 2. It is to be understood that such a telescoping arrangement may be accomplished with inner and outer cross members 53, 55 having square or round cross sections, or other suitable profiles. After the adjuster 47 has been adjusted to provide the desired spacing between the respective base plate members 35, the adjuster 47 is preferably disabled, such as by attaching the outer cross member 55 to the inner cross member 53, to thereby maintain the desired spacing between the respective base plate members 35. By appropriately configuring the adjuster 47, embodiments of the present invention 10 utilizing an adjustable cross member 45 can be embodied as a kit that can accommodate a plurality of different makes and models of towed vehicles.

Each of the base plate members 35 includes a tow bar connector mechanism 57 configured to connect the base plate member 35 to a respective leg 63 of a tow bar 65 for connection to a towing vehicle 67. Each tow bar connector mechanism 57 generally includes a tow bar bracket 73 attached to and extending generally horizontally forwardly from the respective base plate member 35. Each tow bar bracket 73 generally includes a pair of aligned apertures 75 defining a transverse horizontal axis to operatively define a pivot axis 77 for the respective tow bar leg 63 attached thereto.

The connector means 17 is configured to connect the base plate means 15 to the tow hook means 13. The connector means 17 includes at least one connector mechanism 83 configured to be removably secured to a respective one of the tow hook members 23. Thus, if a particular application of the present invention 10 utilizes two tow hook members 23, the present invention 10 generally also utilizes two connector mechanisms 83. Generally, each of the connector mechanisms 83 includes a spacer 85 configured to operatively and abuttingly engage the spacer plate 37 of the respective base plate member 35 and to be slidingly insertable within the confines of the closed loop configuration 27 of the respective tow hook member 23. For example, each of the spacers 85 may comprise the bread slice configuration to correspond with the bread slice configuration 27 of the tow hook member 23 as shown in FIG. 1.

Each of the connector mechanisms 83 generally includes a connector plate 87 operatively oriented substantially parallel to the spacer plate 37. The connector plate 87 is dimensioned such that the connector plate 87 operatively abuttingly engages upper surfaces of the respective tow hook member 23. Each of the connector mechanisms 83 also includes a fastening mechanism 93, such as bolts and nuts as shown in FIG. 1, that is configured to releasably secure the connector plate 87 to the base plate member 35 such that the respective tow hook member 23 is securely clamped therebetween.

For some applications of the present invention, the spacers 85 may be constructed of steel or other suitable rigid material. In that event, the spacers 85 may be secured to the respective spacer plates 37 if desired. Also, the thickness of the spacers 85 will generally be not greater than, and preferably slightly less than, the corresponding thickness of the tow hook members 23 so that the respective tow hook member 23 is securely clamped between the connector plate 87 and the plate 37.

For other applications of the present invention, it may be desirable to construct the spacers 85 from a suitable, slightly compressible material wherein the spacers 85 have a thickness greater than the corresponding thickness of the tow hook members 23. In that event, as the fastening mechanism 93 is being secured such that the connector plate 87 and the spacer plate 37 are being displaced toward each other, the spacers 85 are compressed vertically such that the horizontal extremities of the spacers 85 are caused to expand outwardly, wedging and cushioning the spacers 85 against the inner confines of the closed loop configurations 27 of the respective tow hook members 23 to thereby minimize or eliminate tendencies for rattles to develop from the connector means 17.

The present invention 10 also includes at least one safety chain bracket 95, generally attached to the base plate member 35 and extending generally horizontally forwardly therefrom. The safety chain bracket 95 generally includes an aperture 97 therethrough for securing one end of a safety chain (not shown) thereto.

The present invention 10 may include an adapter 98 for connecting various electrical functions of the towed vehicle 25 to the electrical system of the towing vehicle 67. The adapter generally includes a U-shaped mount 99 attached to and extending forwardly from the base plate means 15.

In an application of the present invention to a vehicle 25 having an opposing pair of factory pre-installed tow hooks, an appropriate one of the base plate members 35 is attached to each of those pre-installed tow hooks, as hereinafter described. An appropriate spacer 85, supported by the spacer plate 37 of the base plate member 35, is displaced upwardly into the closed loop configuration 27 of the tow hook. The connector plate 87 is then positioned above the tow hook and the spacer 85, and the fastening mechanism 93 is then installed to securely clamp the tow hook between the connector plate 87 and the spacer plate 37. After both of the base plate members 35 are installed on the respective factory pre-installed tow hooks, the combination tow hook and base plate system is ready for connection of a tow bar 65 to the tow bar brackets 73 of the base plate members 35 and for connection of the tow bar 65 to the towing vehicle 67. It should be noted that the number of attachments to the towed vehicle 25 has been reduced from four for the '066 patent, hereinbefore described, to only two attachments for the present invention. Further, no frame weakening holes had to be drilled in the towed vehicle 25 in order to install the combination tow hook and base plate system 10. When the tow bar 65 is no longer needed and has been disconnected from the base plate members 35 of the present invention, the connector mechanism 83 is readily accessible from the front of the towed vehicle 25 such that the base plate members 35 can be easily removed for storage. Alternatively, due to the minimal weight characteristics and the minimal forward extension of the base plate members 35, a user may choose to leave the base plate members 35 installed on the tow hooks. In the event, however, that the user needs to use the tow hooks for their originally intended purpose, namely as tow hooks, it would be a simple matter to remove the base plate members 35 at that time. An embodiment of the present invention utilizing the cross member 45, either having an appropriate fixed length or an adjustable length, can be similarly installed on a towed vehicle 25 having factory pre-installed tow hooks.

In an application of the present invention to a vehicle 25 that does not have an opposing pair of factory pre-installed tow hooks, an appropriately designed pair of the tow hook members 23 are installed on the towed vehicle 25 similarly to that of pre-installed tow hooks provided by automobile manufacturers. After the tow hook members 23 are installed on the towed vehicle 25, use of the remaining components of the combination tow hook and base plate system for tow bar connection 10 is substantially the same as that described in the immediately preceding paragraph. Again, an embodiment of the present invention utilizing the cross member 45, either having an appropriate fixed length or an adjustable length, can be similarly installed on a towed vehicle 25 not having factory pre-installed tow hooks. An embodiment utilizing the cross member 45 having an adjustable length may be preferred for a kit embodiment of the present invention to thereby reduce the number of kits that might be needed for adaptation to the numerous available makes and models of towed vehicles. It should be noted that the present invention provides both (i) the ability to connect a tow bar to the towed vehicle for towing the towed vehicle behind a recreational vehicle, and (ii) the ability to connect a towing cable, for example, to the towed vehicle for towing the towed vehicle behind a wrecker, for example.

It is to be understood that while certain forms of the present invention have been illustrated and described herein, the present invention is not to be limited to the specific forms or arrangement of parts described and shown.

What is claimed and desired to be secured by Letters Patent is as follows:

1. A tow hook apparatus for connecting a towed vehicle to a tow bar, said apparatus comprising:
   (a) tow hook means connected to a towed vehicle;
   (b) base plate means for connecting to a tow bar; and
   (c) connector means connecting said base plate means only to said towed vehicle by said tow hook means.

2. The apparatus according to claim 1, wherein said tow hook means includes at least one tow hook member connected to the towed vehicle.

3. The apparatus according to claim 2, wherein said at least one tow hook member has a closed loop configuration.

4. The apparatus according to claim 3, wherein said closed loop configuration has a bread slice configuration.

5. The apparatus according to claim 3, wherein said connector means includes a connector mechanism for each said at least one tow hook member, each connector mechanism including a spacer configured to be slidably insertable through said closed loop configuration of said at least one tow hook member.

6. The apparatus according to claim 5, wherein each base plate means includes a base plate member for each tow hook member, each base plate member including a horizontally oriented spacer plate.

7. The apparatus according to claim 6, wherein each connector mechanism further includes a connector plate and a fastening mechanism, wherein the respective connector plate, spacer plate, and fastening mechanism are configured to cooperatively and removably secure the respective base plate member to the respective tow hook member.

8. The apparatus according to claim 2, wherein the base plate means includes a base plate member for each tow hook member.

9. The apparatus according to claim 8, wherein each base plate member includes a horizontally oriented spacer plate.

10. The apparatus according to claim 9, wherein each base plate member includes a stiffener.

11. The apparatus according to claim 8, wherein each base plate member includes a tow bar connector mechanism.

12. The apparatus according to claim 2, wherein the connector means includes a connector mechanism for each tow hook member.

13. The apparatus according to claim 1, wherein the tow hook means includes two transversely opposed tow hook members connected to the towed vehicle.

14. The apparatus according to claim 13, wherein the base plate means includes two base plate members configured to be operatively connected to the respective tow hook members.

15. The apparatus according to claim 14, wherein the base plate means further includes a cross member connected to the base plate members.

16. The apparatus according to claim 15, wherein the length of the cross member is adjustable.

17. The apparatus according to claim 13, wherein the connector means includes two connector mechanisms configured to operatively connect the base plate members to the respective tow hook members.

18. The apparatus according to claim 17, wherein:
   (a) each tow hook member has a closed loop configuration; and
   (b) each connector mechanism includes a spacer configured to be insertable through the respective closed loop configuration.

19. The apparatus according to claim 18, wherein each spacer is constructed of rigid material and has a thickness less than a corresponding thickness of the respective tow hook member.

20. The apparatus according to claim 18, wherein each spacer is constructed of compressible material and has a thickness greater than a corresponding thickness of the respective tow hook member such that the spacer is wedged against the tow hook member as the connector mechanism securely connects the base plate member to the tow hook member.

21. The apparatus according to claim 1, wherein the tow hook means includes two factory pre-installed tow hooks connected to the towed vehicle.

22. The apparatus according to claim 1, further including at least one safety chain bracket attached to the base plate means.

23. A tow hook apparatus for connecting a towed vehicle to a tow bar of a towing vehicle, said apparatus comprising:
   (a) a pair of transversely opposed tow hook members connected to a towed vehicle, each tow hook member having a closed loop configuration;
   (b) a pair of base plate members for connection to a tow bar, each base plate member including a horizontally oriented spacer plate, a stiffener, a cross member interconnecting the base plate members, and a tow bar connector mechanism; and
   (c) a pair of connector mechanisms connecting the base plate members to the tow hook members, each connector mechanism including a connector plate, a spacer configured to be slidably insertable through the closed loop configuration of the respective tow hook member, and a fastening mechanism; and
wherein the respective connector plate, spacer plate, and fastening mechanism cooperatively and removably secure the respective base plate member to the respective tow hook member.

24. A kit for connecting a towed vehicle to a tow bar of a towing vehicle, said kit comprising:
   (a) a pair of tow hook members for connecting to frame structure of a towed vehicle wherein each tow hook member has a closed loop configuration;
   (b) a pair of base plate members for connecting to a tow bar wherein each base plate member includes a horizontally oriented spacer plate, a stiffener, a cross member interconnecting the base plate members and having an adjustable length, and a tow bar connector mechanism; and
   (c) a pair of connector mechanisms connecting the base plate members to the tow hook members, each connector mechanism including a connector plate, a spacer configured to be slidably insertable through the closed loop configuration of the respective tow hook member, and a fastening mechanism;
the respective connector plate, spacer plate, and fastening mechanism configured to cooperatively and removably secure the respective base plate member to the respective tow hook member.

25. A method of providing a dual purpose, tow hook/base plate system for connecting a towed vehicle to a tow bar, comprising the steps of:
   (a) connecting at least one tow hook having a closed loop configuration to the frame of a towed vehicle;
   (b) providing a base plate member for each said at least one tow hook wherein said base plate member has a spacer plate and a tow bar connector mechanism for attaching to a tow bar; and
   (c) providing a connector mechanism having a spacer that is insertable through said closed loop configuration, a connector plate and a fastening mechanism configured such that the respective tow hook is removably clamped between said connector plate and said spacer plate by said fastening mechanism.

* * * * *